United States Patent
Kuwamura

(10) Patent No.: US 9,626,201 B2
(45) Date of Patent: Apr. 18, 2017

(54) PROCESSOR EMULATION DEVICE AND STORAGE MEDIUM

(71) Applicant: FUJITSU LIMITED, Kawasaki-shi (JP)

(72) Inventor: Shinya Kuwamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 729 days.

(21) Appl. No.: 13/733,993

(22) Filed: Jan. 4, 2013

(65) Prior Publication Data

US 2013/0262075 A1  Oct. 3, 2013

(30) Foreign Application Priority Data

Mar. 27, 2012  (JP) .................. 2012-072236

(51) Int. Cl.
*G06F 9/455*  (2006.01)
(52) U.S. Cl.
CPC .......... *G06F 9/455* (2013.01); *G06F 9/45558* (2013.01); *G06F 2009/45583* (2013.01)
(58) Field of Classification Search
None
See application file for complete search history.

(56) References Cited

U.S. PATENT DOCUMENTS

| | | | |
|---|---|---|---|
| 6,671,791 B1 * | 12/2003 | McGrath | 711/206 |
| 7,062,631 B1 * | 6/2006 | Klaiber | G06F 12/1027 711/141 |
| 7,260,702 B2 | 8/2007 | Vega et al. | |
| 7,334,107 B2 * | 2/2008 | Schoinas | G06F 12/1027 711/118 |
| 8,024,730 B2 * | 9/2011 | Campbell et al. | 718/100 |
| 9,274,974 B1 * | 3/2016 | Chen | G06F 12/109 |
| 2003/0200402 A1 * | 10/2003 | Willman | G06F 12/145 711/154 |
| 2004/0139346 A1 * | 7/2004 | Watt | G06F 21/74 713/166 |

(Continued)

FOREIGN PATENT DOCUMENTS

JP  2006-18819  1/2006

OTHER PUBLICATIONS

Matt Welsh("CS161: Operating Systems", Harvard University, 2007, pp. 1-27 ).*

(Continued)

*Primary Examiner* — Thai Phan
*Assistant Examiner* — Iftekhar Khan
(74) *Attorney, Agent, or Firm* — Fujitsu Patent Center

(57) ABSTRACT

A processor emulation device comprising includes an address converter converting a virtual address in a guest environment into a physical address in a host environment, wherein a correspondence between the virtual address and a physical address in the guest environment is different from a correspondence between a virtual address and the physical address in the host environment controlled by a host OS; and an exception handling processing part, in a case where a page attribute obtained in converting the virtual address in the guest environment into the physical address in the guest environment is an attribute specific to the guest environment and absent in the host environment, performing an exception handling process based on the attribute specific to the guest environment.

2 Claims, 11 Drawing Sheets

(56) References Cited

U.S. PATENT DOCUMENTS

| | | | |
|---|---|---|---|
| 2005/0086450 A1* | 4/2005 | Shiota | G06F 12/1027 711/207 |
| 2006/0069899 A1* | 3/2006 | Schoinas | G06F 12/109 711/206 |
| 2006/0075146 A1* | 4/2006 | Schoinas | G06F 12/1009 710/3 |
| 2006/0075285 A1* | 4/2006 | Madukkarumukumana | G06F 11/07 714/5.11 |
| 2006/0123416 A1* | 6/2006 | Bertolotti et al. | 718/1 |
| 2007/0038435 A1* | 2/2007 | Koizumi | 703/27 |
| 2007/0057957 A1* | 3/2007 | Wooten | 345/566 |
| 2007/0260447 A1* | 11/2007 | Canton | 703/27 |
| 2009/0016566 A1* | 1/2009 | Goto et al. | 382/100 |
| 2009/0172713 A1* | 7/2009 | Kim | G06F 9/30145 719/331 |
| 2009/0204957 A1* | 8/2009 | Nishibayashi et al. | 717/172 |
| 2011/0047543 A1* | 2/2011 | Mohinder | G06F 12/145 718/1 |
| 2011/0078361 A1* | 3/2011 | Chen | G06F 12/145 711/6 |
| 2011/0219208 A1* | 9/2011 | Asaad | G06F 15/76 712/12 |
| 2012/0124271 A1* | 5/2012 | Evans | 711/6 |
| 2012/0151116 A1* | 6/2012 | Tuch | G06F 12/1009 711/6 |
| 2012/0191900 A1* | 7/2012 | Kunimatsu et al. | 711/103 |

OTHER PUBLICATIONS

Freescale Semiconductor App. Note("Page Table Translation Setup", Freescale Semiconductor, 2010, pp. 1-24).*

* cited by examiner

FIG.5

| TARGET PHYSICAL ADDRESS SPACE | MEMORY/DEVICE |
|---|---|
| 00000000-10000000 | MEMORY:20001000 |
| 10000000-10010000 | DEVICE:VGA |
| ... | ... |

FIG.7

| TARGET HEADER ADDRESS OF CONVERSION TABLE 62 | HEADER ADDRESS OF CONVERSION TABLE 42 OF HOST |
|---|---|
| 00001000 | 20002000 |

FIG.9

| PAGE ATTRIBUTE | ARM | Intel |
|---|---|---|
| EXECUTION PERMISSION | XN | XD |
| ACCESS PERMISSION | AP | R/W,U/S |
| ACCESS RECORD | AP[0] | A,D |
| CACHE CONTROL | TEX,C,B | PWT,PCD,PAT |
| MULTIPLE PROCESSOR | S | G |

PROCESSOR EMULATION DEVICE AND STORAGE MEDIUM

CROSS-REFERENCE TO RELATED APPLICATIONS

This application is based upon and claims the benefit of priority of the prior Japanese Patent Application No. 2012-072236, filed on Mar. 27, 2012, the entire contents of which are incorporated herein by reference.

FIELD

The embodiment discussed herein is related to an emulation device (processor emulation device) and a storage medium.

BACKGROUND

There has been known a technique where, in order to execute software on an environment different from a specific environment on which the software is developed to be executed, software called "emulator" is executed so that the software developed for the specific environment is executed on the emulator. This technique may be called "emulation".

A general processor includes a Memory Management Unit (MMU), so that the MMU uses an address conversion table to convert a virtual address that a host OS recognizes into a physical address.

Further, the emulator that executes the emulation of the MMU of the processor converts a physical address that a guest OS recognizes into a virtual address that the host OS recognizes. By doing this, a guest program running on the guest OS may access a memory via the guest OS, the emulator, and the MMU.

In relation to this, in a multimode architecture computer system, there has been known a method of switching temporary processor mode contexts between first and second modes. In this method, the MMU of the computer system is first deactivated. Then, the mode control register is changed to set (change) the context bit from the first mode to the second mode. Then, a new page table related to the second mode is read, and the MMU is activated again.

Reference may be made to Japanese Laid-open Patent Publication No. 2006-018819.

SUMMARY

According to an aspect, a processor emulation device comprising includes an address converter converting a virtual address in a guest environment into a physical address in a host environment, wherein a correspondence between the virtual address and a physical address in the guest environment is different from a correspondence between a virtual address and the physical address in the host environment controlled by a host OS; and an exception handling processing part, in a case where a page attribute obtained in converting the virtual address in the guest environment into the physical address in the guest environment is an attribute specific to the guest environment and absent in the host environment, performing an exception handling process based on the attribute specific to the guest environment.

The objects and advantages of the embodiments disclosed herein will be realized and attained by means of the elements and combinations particularly pointed out in the claims.

It is to be understood that both the foregoing general description and the following detailed description are exemplary and explanatory and are not restrictive of the invention as claimed.

BRIEF DESCRIPTION OF DRAWINGS

FIG. 5 illustrates an example conversion table 52 of an emulator 50;

FIG. 7 illustrates an example positional relationship table for the conversion table;

FIG. 9 illustrates an example list of page attributes common to an ARM architecture of a guest environment and an Intel architecture of a host environment;

DESCRIPTION OF EMBODIMENT

When emulation is executed in a general processor, the processing time may be delayed due to conversion occurring more than once.

Further, in the method described above, the emulation is executed by assuming that modes having the same or similar architecture are switched from one mode to another, the modes including, for example, a long mode of an x86-64 architecture, a legacy mode of the architecture, or 32-bit v86-mode code.

Therefore, there may be a case where software having been developed for a different environment is unable to operate in high-speed.

According to an embodiment, it may become possible to quickly execute software having been developed for a different environment.

In the following, embodiments are described with reference to the accompanying drawings.

EMBODIMENTS

First Embodiment

In the following, an emulation device (processor emulation device) and an emulation program are described with reference to the drawings.

Hardware Configuration

Figure 1:
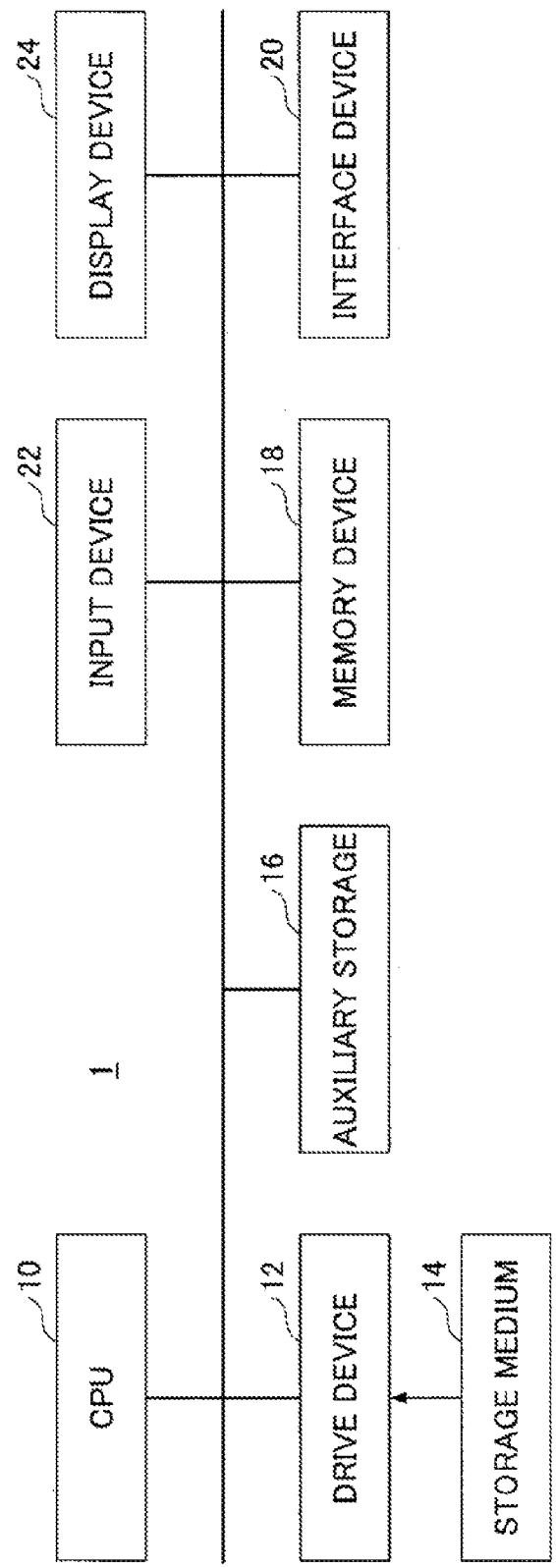
FIG. 1 illustrates an example hardware configuration of an emulation device (processor emulation device) 1 according to a first embodiment.

FIG. 1 illustrates an example hardware configuration of an emulation device (processor emulation device) 1 according to a first embodiment. As illustrated in FIG. 1, the emulation device 1 includes a Central Processing Unit (CPU) 10, a drive device 12, an auxiliary storage 16, a memory device 18, an interface device 20, an input device 22, and a display device 24. Those elements are connected to each other via a bus, a serial line, and the like.

The CPU 10 is, for example, a processor serving as an arithmetic processing unit including a program counter, an instruction decoder, various computing units, a Load Store Unit (LSU), a general-purpose register and the like.

The drive device 12 may read a program and data from a storage medium 14. Namely when the storage medium 14 storing a program is placed in the drive device 12, the program may be installed from the storage medium 14 to the auxiliary storage 16 via the drive device 12.

The storage medium 14 is, for example, a portable storage medium such as a Compact Disc (CD), a Digital Versatile Disc (DVD), a Universal Serial Bus (USB) memory, a flash memory or the like.

To install a program, in addition to the use of the storage medium 14, the interface device 20 may be used to download the program from another computer via a network, so as to install the program in the auxiliary storage 16.

The network may be the Internet, a Local Area Network (LAN), a wireless network or the like. Further, the program may be stored in advance in the auxiliary storage 16 or a Read-Only Memory (ROM) before the shipment of the emulation device 1.

By executing the program installed or stored in advance as described above by the CPU 10, an information processing apparatus having the configuration of FIG. 1 may function (serve) as the emulation device 1 according to this embodiment.

The memory device 18 may be, for example, a Random Access Memory (RAM), or an Electrically Erasable and Programmable Read-Only Memory (EEPROM). The interface device 20 controls, for example, the connection to the network.

The input device 22 may be, for example, a keyboard, a mouse, a button, a touch pad, a touch panel, a microphone and the like. Further, the display device 24 may be, for example, a Liquid Crystal Display (LCD), a Cathode Ray Tube (CRT) or the like.

Further, the emulation device 1 may further include another type of an output device such as a printer, a speaker and the like in addition to the display device 24.

Software Configuration

Figure 2:
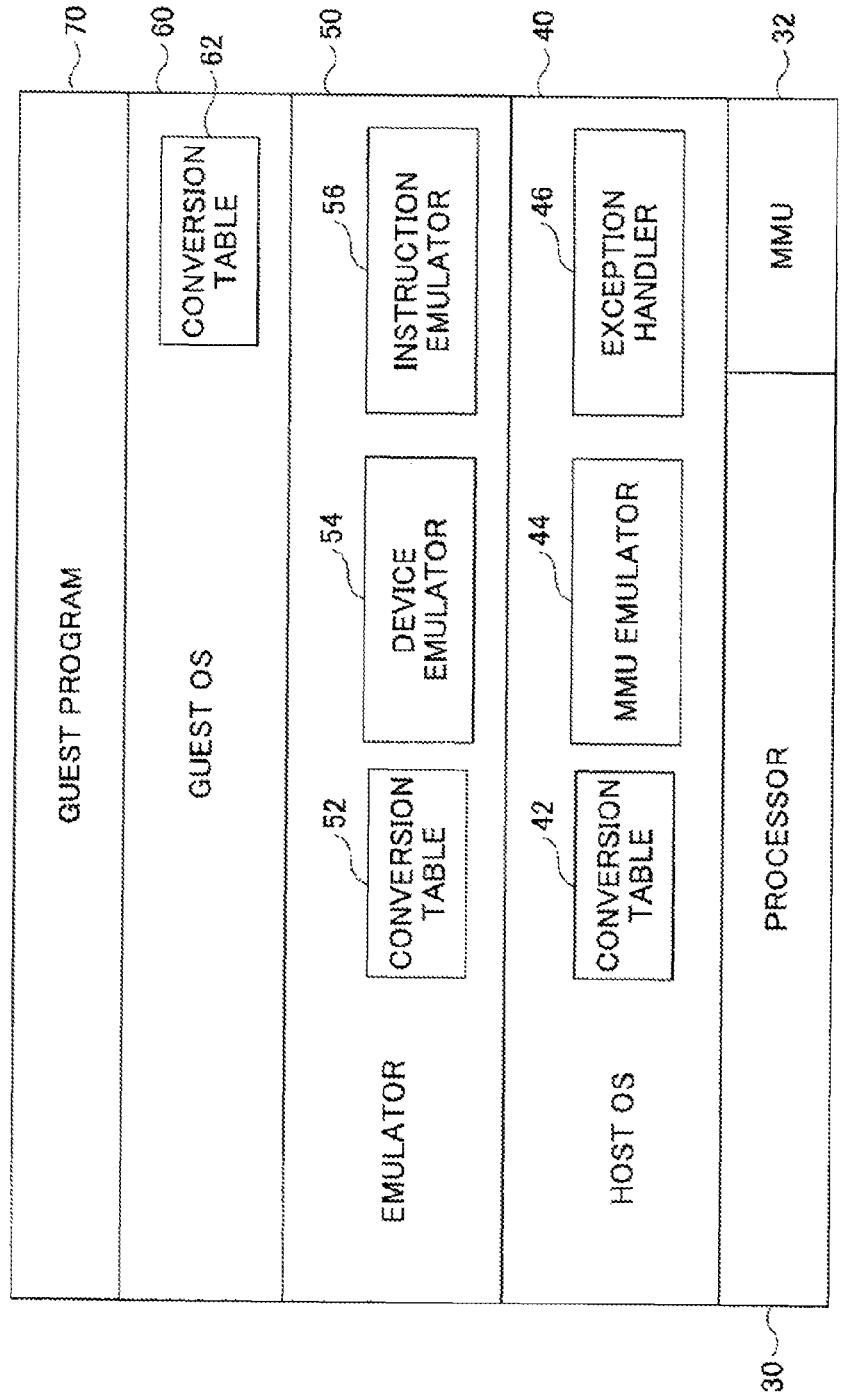
FIG. 2 illustrates an example software configuration of the emulation device 1 according to the first embodiment.

FIG. 2 illustrates an example software configuration of the emulation device 1 according to this embodiment. As illustrated in FIG. 2, the emulation device 1 includes a processor 30, a Memory Management Unit (MMU) 32, a host Operating System (OS) 40, an emulator 50, a guest OS 60, and a guest program 70. The processor 30 corresponds to a part or all of the hardware of FIG. 1.

The host OS 40 includes an MMU emulator 44 and an exception handler 46. Further, the emulator 50 includes a device emulator 54 and an instruction emulator 56. Here, it is not desired for those functional blocks to be realized based on, for example, corresponding programs separated from each other. Namely, for example, some of the functional blocks may be called as a subroutine or a function from another program.

For example, the host OS 40 may be an operating system corresponding to an x86 processor of Intel (registered trademark).

On the other hand, the guest OS 60 is an operating system based on ARM (registered trademark) architecture. Further, the guest program 70 is a program that may run on a guest environment controlled by the guest OS 60.

The emulator 50 intermediates between a conversion table 62 of the guest OS 60 and a conversion table 42 to which the MMU 32 refers, so as to convert a physical address recognized by the guest OS into a virtual address to be recognized by the host OS 40.

By doing this, it may become possible for the guest program 70 to use a hardware resource of the processor 30, the guest program 70 being provided so as to run on a guest environment having a correspondence between the virtual address and the physical address, the correspondence being different from that of the host environment controlled by the host OS 40.

Namely, the guest program 70 may use the hardware resource of the processor 30, the guest program 70 being provided to run on the guest environment having a correspondence between the virtual addresses and the physical addresses, the correspondence being different from the correspondence between the virtual address and the physical address in the host environment controlled by the host OS 40.

Figure 3:
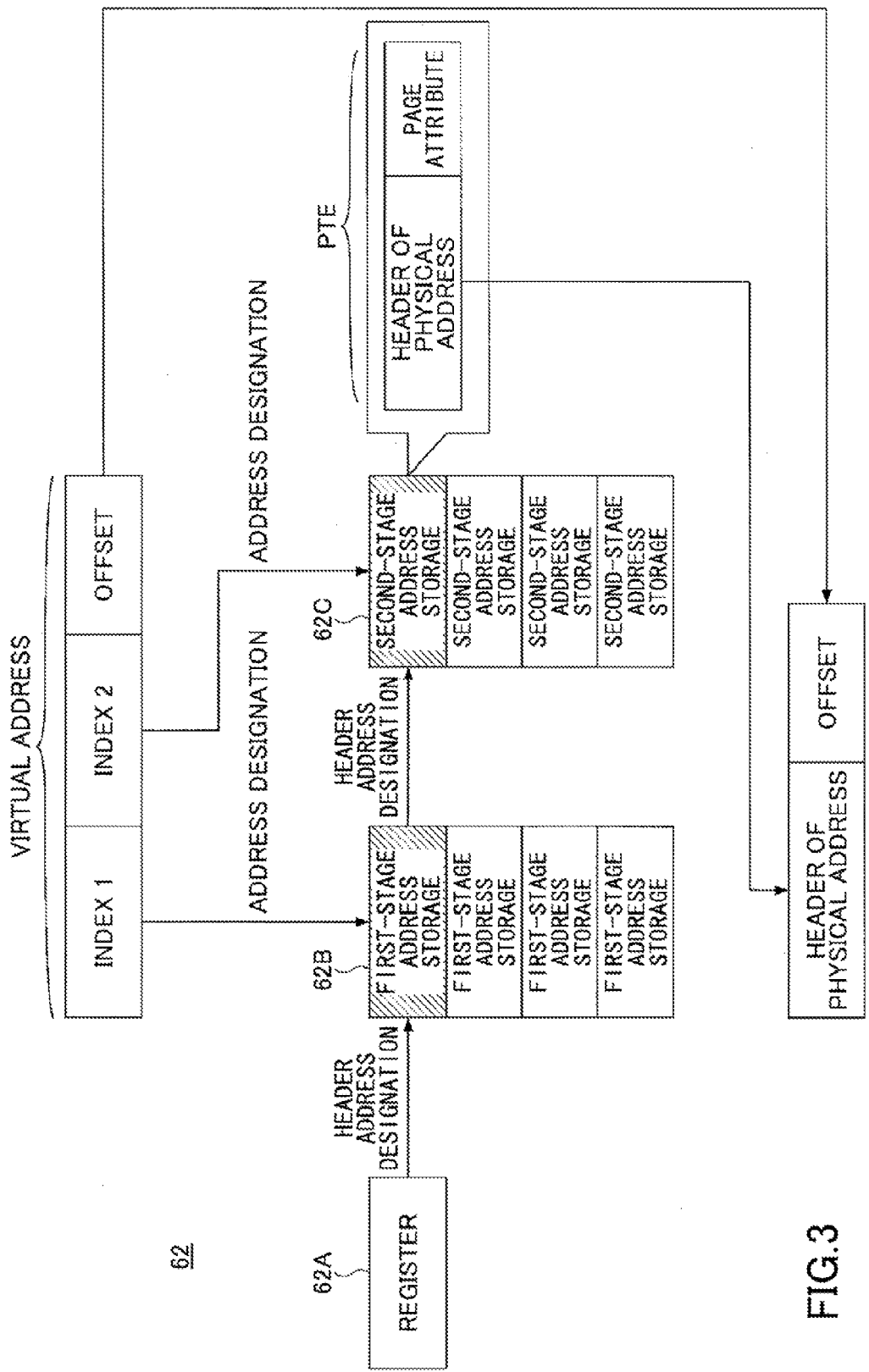
FIG. 3 conceptually illustrates an example configuration of a conversion table 62 of a guest OS.

FIG. 3 conceptually illustrates an example structure of the conversion table 62 of the guest OS 60. As illustrated in FIG. 3, the conversion table 62 includes a register 62A, a first-stage address storage 62B, and a second-stage address storage 62C. For example, those address storages 62A and 62B may be a dedicated area of the memory device 18.

The register 62A stores the header address of the dedicated area where the first-stage address storage 62B is stored. The contents (data) of the register 62A are rewritten (written) by the guest OS 60. Upon the guest program 70 being switched from one to another, the guest OS 60 rewrites the contents of the register 62A, so that the guest OS 60 provides the conversion tables 62 corresponding to the guest programs 70.

Further, as illustrated in FIG. 3, for example, the virtual address includes an index 1, an index 2, and an offset. When the virtual address is given (provided), the guest OS 60 reads out the data stored in an address of an area, the address being indicated by the index 1, the area having the header address indicated by (the data of) the register 62A and being included in the first-stage address storage 62B.

Then, the guest OS 60 further reads out the data stored in an address of an area, the address being indicated by the index 2, the area having the header address indicated by (the data of) the read out data and being included in the second-stage address storage 62C.

Here, the data read out from the from the second-stage address storage 62C are Page Table Entries (PTE) that includes the header of the physical address and a page attribute. The guest OS 60 outputs a combination as the physical address, the combination including the header of the physical address of the read-out PTE and the offset included in the virtual address.

In the conversion tables 62, 52, and 42, corresponding Translate Lookaside Buffer (TLB) are set. With respect to the conversion tables, the TLB serves (has a function) as if the TLB were a cache memory with respect to a memory. Namely, a fast conversion may be achieved by storing a pair of a virtual address and a physical address, and converting the virtual address stored in the TLB without using any conversion table.

Figure 4:
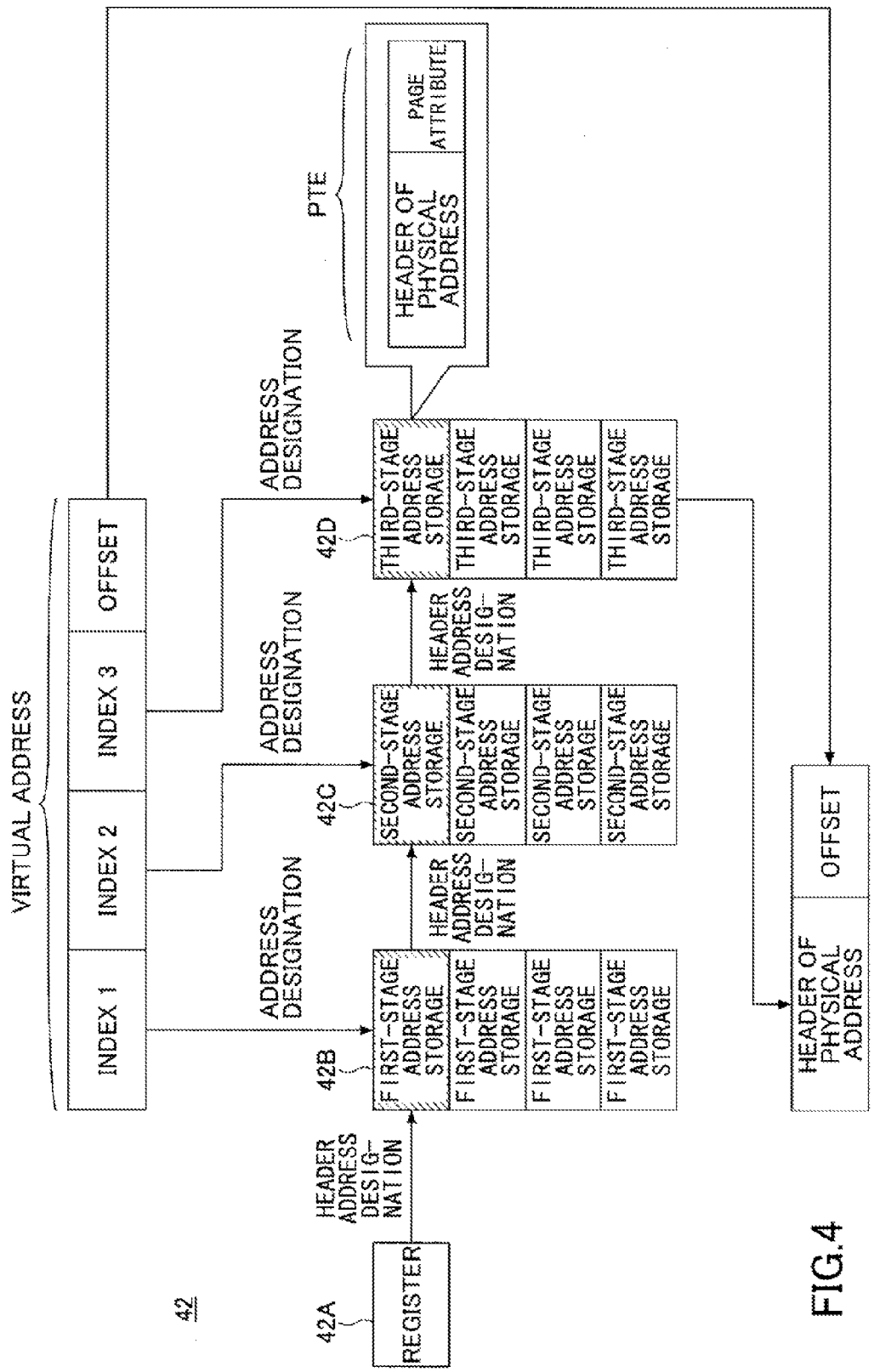
FIG. 4 conceptually illustrates an example configuration of a conversion table 42 to which an MMU refers.

FIG. 4 conceptually illustrates an example structure of the conversion table 42 to which the MMU 32 refers. As illustrated in FIG. 4, the conversion table 42 includes a register 42A, a first-stage address storage 42B, a second-stage address storage 42C, and a third-stage address storage 42D.

For example, those address storages 42A, 42B, and 42C may be a dedicated area of the memory device 18. The register 42A stores the header address of the dedicated area where the first-stage address storage 42B is stored.

Further, as illustrated in FIG. 4, for example, the virtual address includes an index 1, an index 2, an index 3 and an offset. When the virtual address is given (provided), the MMU 32 reads out the data stored in an address of an area, the address being indicated by the index 1, the area having the header address indicated by (the data of) the register 42A and being included in the first-stage address storage 42B.

Then, the MMU 32 further reads out the data stored in an address of an area, the address being indicated by the index 2, the area having the header address indicated by (the data of) the read out data and being included in the second-stage address storage 42C. Similarly, the MMU 32 further reads out the data stored in an address of an area, the address being indicated by the index 3, the area having the header address indicated by (the data of) the read out data and being included in the third-stage address storage 42D.

Here, the data read out from the from the third-stage address storage 42D are Page Table Entry (PTE) including the header of the physical address and a page attribute. The MMU 32 outputs a combination as the physical address, the combination including the header of the physical address of the read-out PTE and the offset included in the virtual address.

FIG. 5 is an example conversion table 52 of the emulator 50. By using such a conversion table, the emulator 50 converts the physical address that the guest OS 60 recognizes into the virtual address that the host OS 40 recognizes. Further, the emulator 50 causes the device emulator 54 or the instruction emulator 56 depending on which of a memory space, a device space, or an instruction space is the address space that is addressed.

By using the conversion tables 62, 52, and 42, the MMU emulator 44 registers the correspondence between the virtual address that the host OS 40 recognizes and the physical address that the guest OS 60 recognizes into a new part of the conversion table 42.

By doing this, it may become possible to quickly convert the physical address that the guest OS 60 recognizes into the virtual address that the host OS 40 recognizes. In the following, a process of registering the correspondence into the conversion table 42 is described.

Figure 6:
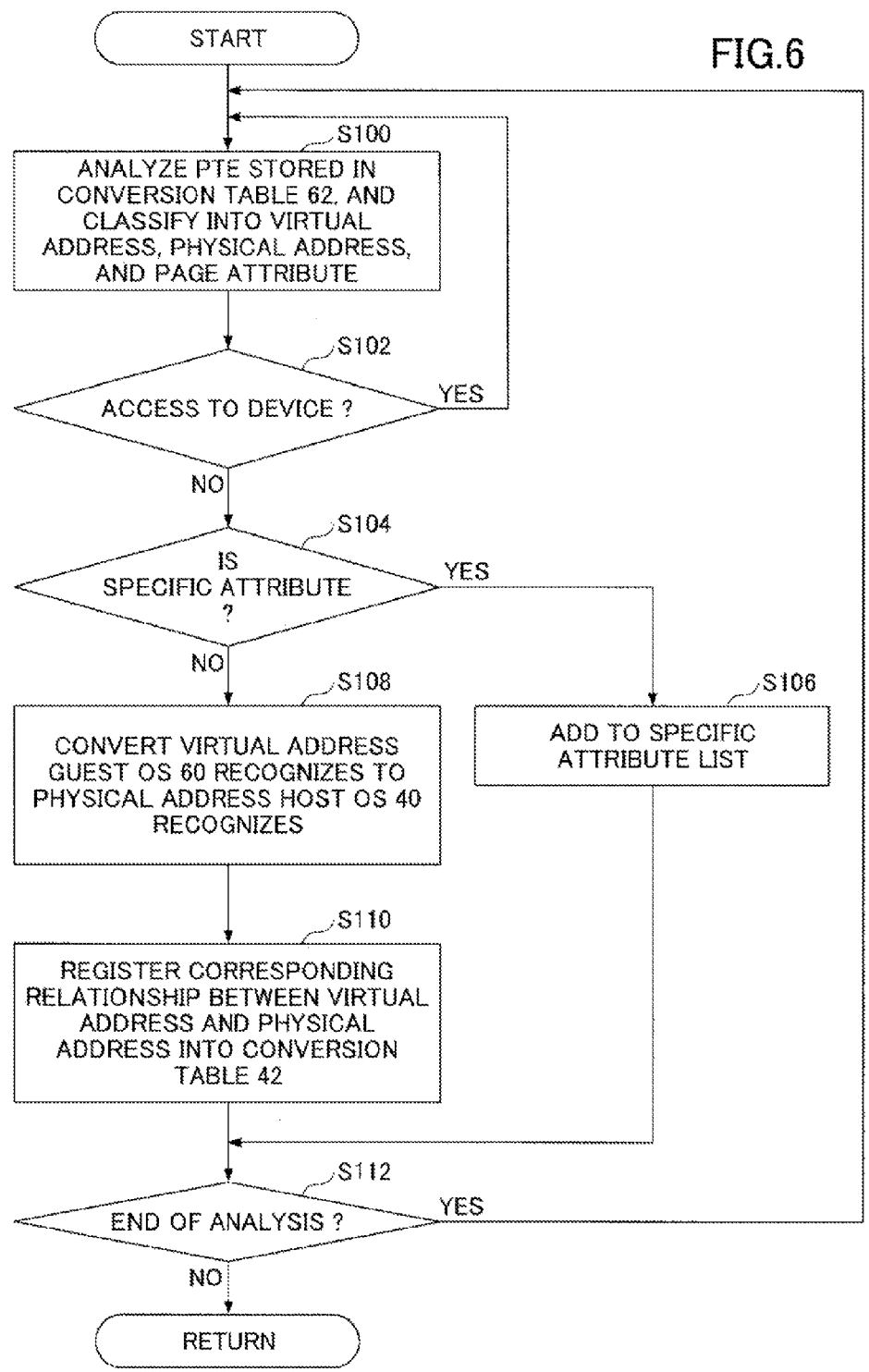
FIG. 6 is an example flowchart of a PTE-addition process executed by an MMU emulator 44.

FIG. 6 is an example flowchart of a PTE-addition process executed by the MMU emulator 44. This flowchart may be executed, for example, when the guest program 70 is loaded from the auxiliary storage 16 to the memory device 18 and when a new PTE is added to the conversion table 62.

First, the MMU emulator 44 analyzes the PTE stored in the conversion table 62 corresponding to the guest program 70, and classifies (divides) the PTE into a virtual address, a physical address, and a page attribute (step S100).

Next, based on the classified physical address, the MMU emulator 44 determines whether the device access refers (corresponds) to the access to a device (step S102). When determining that the device access refers to the access to a device (YES in step S102), the process goes back to step S100, so that the MMU emulator 44 analyzes the next PTE.

On the other hand, when determining that the device access does not refer to the access to a device (NO in step S102), the process goes to step S102. Then, the MMU emulator 44 further determines whether the page attribute included in the PTE is specific to the guest environment (step S104).

When determining that the page attribute included in the PTE is specific to the guest environment (YES in step S104), the MMU emulator 44 registers the page attribute into a specific attribute list stored by the MMU emulator 44 (step S106). Details of the attribute(s) are described below.

On the other hand, when determining that the page attribute included in the PTE is not specific to the guest environment (NO in step S104), the MMU emulator 44 converts the virtual address that the guest OS 60 recognizes into the physical address that the host OS 40 recognizes by using the conversion tables 62, 52, and 42 (step S108).

Then, the MMU emulator 44 registers the correspondence converted in step S108 between the virtual address that the guest OS 60 recognizes and the physical address that the host OS 40 recognizes.

Then the processes of steps S104 through S110 are completed, the MMU emulator 44 determines whether the analysis is to be terminated (step S112). When determining that the analysis is not to be terminated (NO in step S112), the process goes back to step S100, so that the MMU emulator 44 may again execute the process of step S100.

Opposite to the flowchart of FIG. 6, when, for example, the guest program 70 ends, the MMU emulator 44 deletes the PTE from the conversion table 42. In this case, the MMU emulator 44 converts the PTE to be deleted into the PTE of the conversion table 42, deletes the corresponding PTE from the conversion table 42, and further deletes the PTE from the TLB corresponding to the conversion table 42.

Further, when the guest program 70 is switched, the MMU emulator 44 provides a new conversion table 42 corresponding to the guest program 70. In this case, the MMU emulator 44 deletes the PTE corresponding to the old conversion table 42, and searches for a positional relationship table of the conversion table using the address of a new conversion table 62.

FIG. 7 illustrates an example positional relationship table of the conversion table. When there exists the address of the new conversion table 62 in the positional relationship table of the conversion table, the MMU emulator 44 performs conversion by adopting (using) the conversion table 42 described from the header address of the corresponding conversion table 42.

On the other hand, when there is no address of the new conversion table 62 in the positional relationship table of the conversion table, the MMU emulator 44 sets the header address of the new conversion table 42. Further, the MMU emulator 44 generates the conversion table 62 from the set header address based on the process of FIG. 6.

Figure 8:
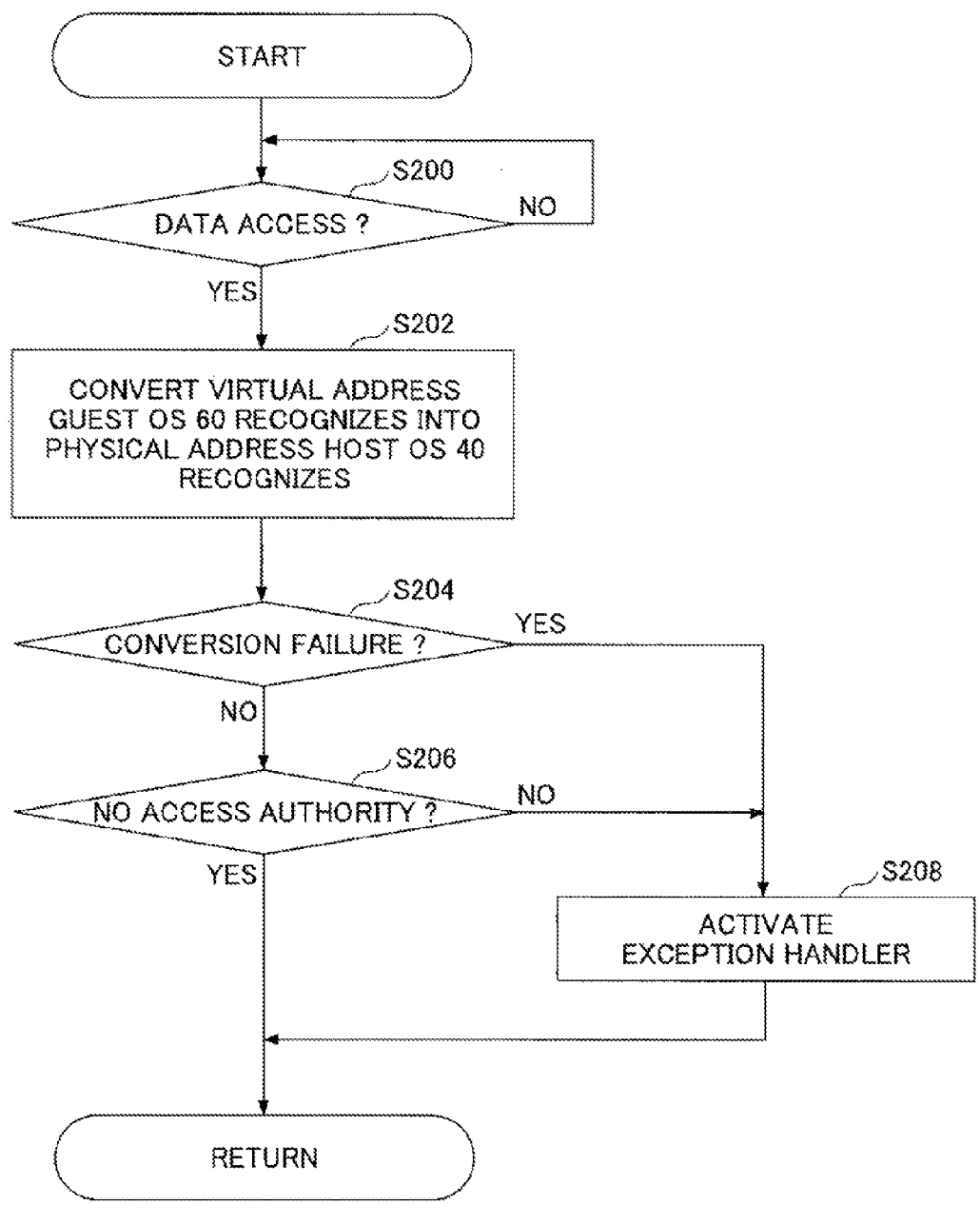
FIG. 8 is an example flowchart of a process executed by the MMU emulator 44.

Next, a process performed by the MMU emulator 44 in case of data access by the guest program 70 is described. FIG. 8 is an example flowchart of the process executed by the MMU emulator 44.

First, the MMU emulator 44 waits for the occurrence of the data access by the guest program (step S200).

Upon the occurrence of the data access by the guest program 70 (YES in step S200), the MMU emulator 44 uses the conversion table 42 to convert the virtual address that the guest OS 60 recognizes into the physical address that the host OS 40 recognizes (step S202).

Next, the MMU emulator 44 determines whether the conversion fails, and further determines whether there is any access authority (steps S204 and S206, respectively).

When determining that the conversion fails (YES in step S204) and/or when determining that there is no access authority (NO in step S206), the process goes to step S208, where the exception handler 46 is activated. Further, in a case where the page to be converted includes an attribute specific to the guest environment, the MMU emulator 44 activates the exception handler 46 by, for example, outputting a pseudo conversion-failure signal.

The exception handler 46 determines whether the data access corresponds to a memory access. When determining that the data access does not correspond to a memory access, the exception handler 46 causes the device emulator 54 or the instruction emulator 56 to perform the emulation.

Further, in a case where the page attribute included in the PTE related to the data access is the attribute specific to the guest environment, the exception handler 46 performs the process on data in accordance with the specific attribute.

In the following, the attribute specific to the guest environment or the host environment and the attribute common to both the guest environment and the host environment are described.

FIG. 9 illustrates an example list of page attributes common to an ARM architecture of a guest environment and an Intel architecture of a host environment.

Figure 10:
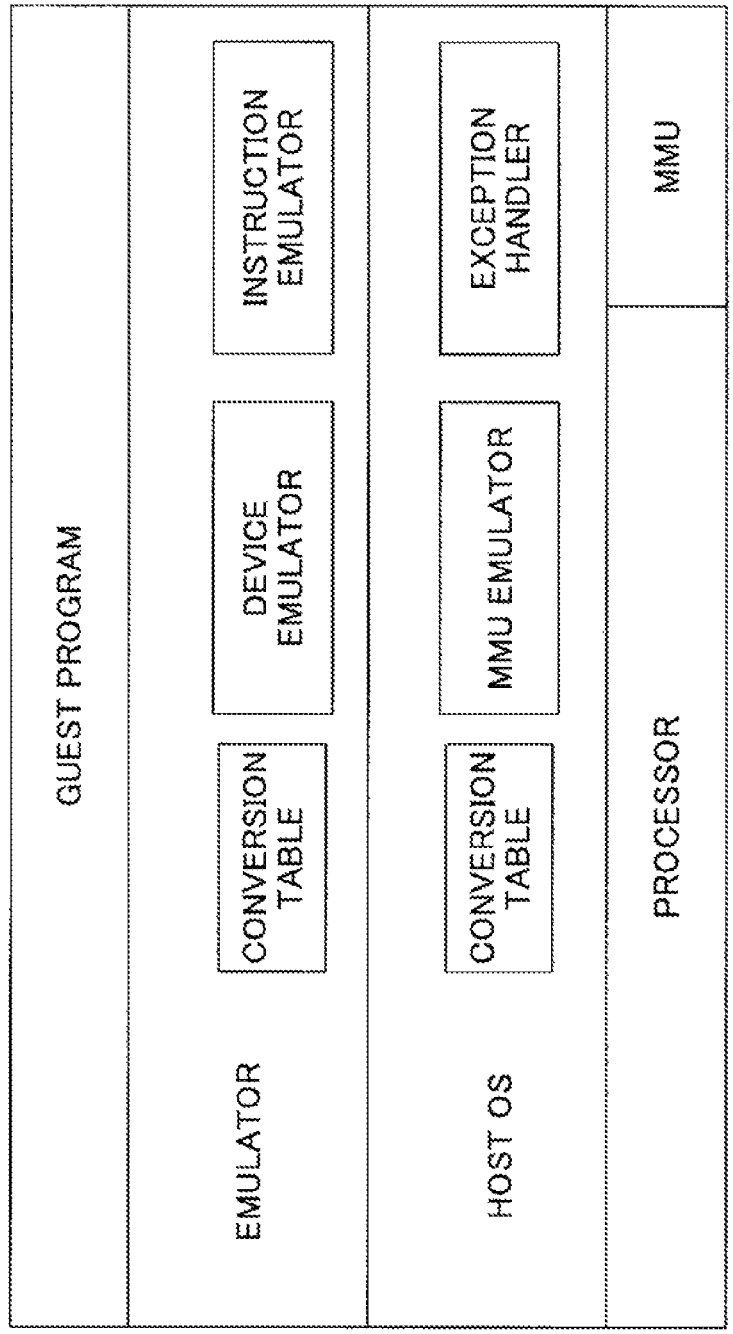
FIG. 10 is an example software configuration of an emulation device (processor emulation device) 2 according to a second embodiment.

In FIG. 10, the symbol "XN" in the ARM architecture denotes an "execute-never bit" indicating a bit to control whether to execute. On the other hand, the symbol "XD" in the Intel architecture denotes "execute-disable" indicating execution permission.

Further, the symbol "AP" in the ARM architecture denotes "Access Permission bits" indicating a bit to control whether the access is to be permitted.

On the other hand, the symbol "R/W" in the Intel architecture denotes "Read/Write" indicating write permission, and the symbol "U/S" in the Intel architecture denotes "User/Supervise" indicating the writing permission in a user mode.

Further, the symbol "AP[0]" in the ARM architecture denotes an "Access flag" indicating a bit recording whether the access is done. On the other hand, the symbol "A" in the Intel architecture denotes "Accessed" indicating whether the access is done and the symbol "D" in the Intel architecture denotes "Dirty" recording whether amendment is done.

Further, the symbol "TEX,C,B" in the ARM architecture denotes "Memory region attribute bits" indicating bits to control a cache operation. On the other hand, the symbol "PWT" in the Intel architecture denotes "Page-level Write-Through" indicating Write-through is to be performed and the symbol "PCD" in the Intel architecture denotes "Page-level Cache Disable" indicating valid/invalid of the cache operation.

Further, the symbol "PAT" in the Intel architecture denotes a "Page-Attribute table" indicating valid/invalid of the table where the bits to control the cache operation are collected.

Further, the symbol "S" in the ARM architecture denotes "Sharable" indicating a bit to control whether to share among plural (multiple) processors. On the other hand, the symbol "G" in the Intel architecture denotes "Global" indicating whether to be shared by plural processors.

The above description is about the list of the page attributes common to the ARM architecture of the guest environment and the Intel architecture of the host environment. In addition, there is an attribute specific (unique) to ARM architecture of the host environment.

For example, the page attribute "nG" denotes "not Global". In the ARM architecture, an Address Space Identifier (ASID) is allocated to a virtual address space provided for each of the programs, and in registering in the TLB, a pair of the PTE and the ASID is registered. In this case, only the PTE having a designated ASID from among the PTEs registered in the TLB and where nG=1 is treated (handled) as the erasable PTE.

To respond to the page attribute "nG" of the guest environment, the exception handler 46 performs the following process. The exception handler 46 provides the conversion tables 42 for respective ASIDs. Therefore, when the ASID is changed, the exception handler 46 switches (changes) the conversion table 42.

Further, in changing of the conversion table 42, the exception handler 46 checks the "nG" attribute of the PTE. In the case of nG=0, the exception handler 46 reflects the change to all the conversion tables 42.

In the case of nG=1, the exception handler 46 reflects the change to the conversion tables 42 of the corresponding ASID. Further, alternatively, the process may be performed by the MMU emulator 44.

In addition, the exception handler 46 performs various exception handling processes corresponding to cases where the attribute is specific to the guest environment, when the conversion fails, and when there is no access authority. For example, the exception handler 46 may have functions so as to perform an x-86 page-fault exception handling process and also an emulation process (function.)

When the page to which an occurrence address belongs has a specific attribute, the exception handler 46 calls the emulation process corresponding to the attribute as described above, and reflects the result to the guest environment.

Further, the exception handler 46 checks the access authority in accordance with the attribute. When determining that it is accessible, the exception handler 46 sets the page attribute of the host to be accessible, and reflects the guest environment.

On the other hand, when determining that it is not accessible, the exception handler 46 reflects the error code to the guest environment, the error code indicating that it is not accessible.

As described above, in the emulation device and the emulation program according to this embodiment, the exception handling process is performed on the data having an attribute specific to the guest environment. Therefore, it may become possible to swiftly execute the software having been developed for a different environment.

The terms "address converter" and "exception handling part" in claims correspond to, for example, the MMU emulator 44 and the exception handler 46.

In the following, another embodiment is described where software arrangement of the emulation device 1 in the first embodiment is changed.

Second Embodiment

FIG. 10 illustrates an example software configuration of an emulation device (processor emulation device) 2 according to a second embodiment. When compared with the emulation device 1 according to the first embodiment, in the emulation device 2 according to the second embodiment, the guest OS 60 is omitted.

Due to this configuration, the emulation device 2 according to the second embodiment executes the emulation of the processor, and may be adapted to a user-mode emulation of QEMU (Quick EMUlator) which is a processor emulator of an open source. The user-mode emulation may execute a process designed for a certain processor with another processor.

Third Embodiment

Figure 11:
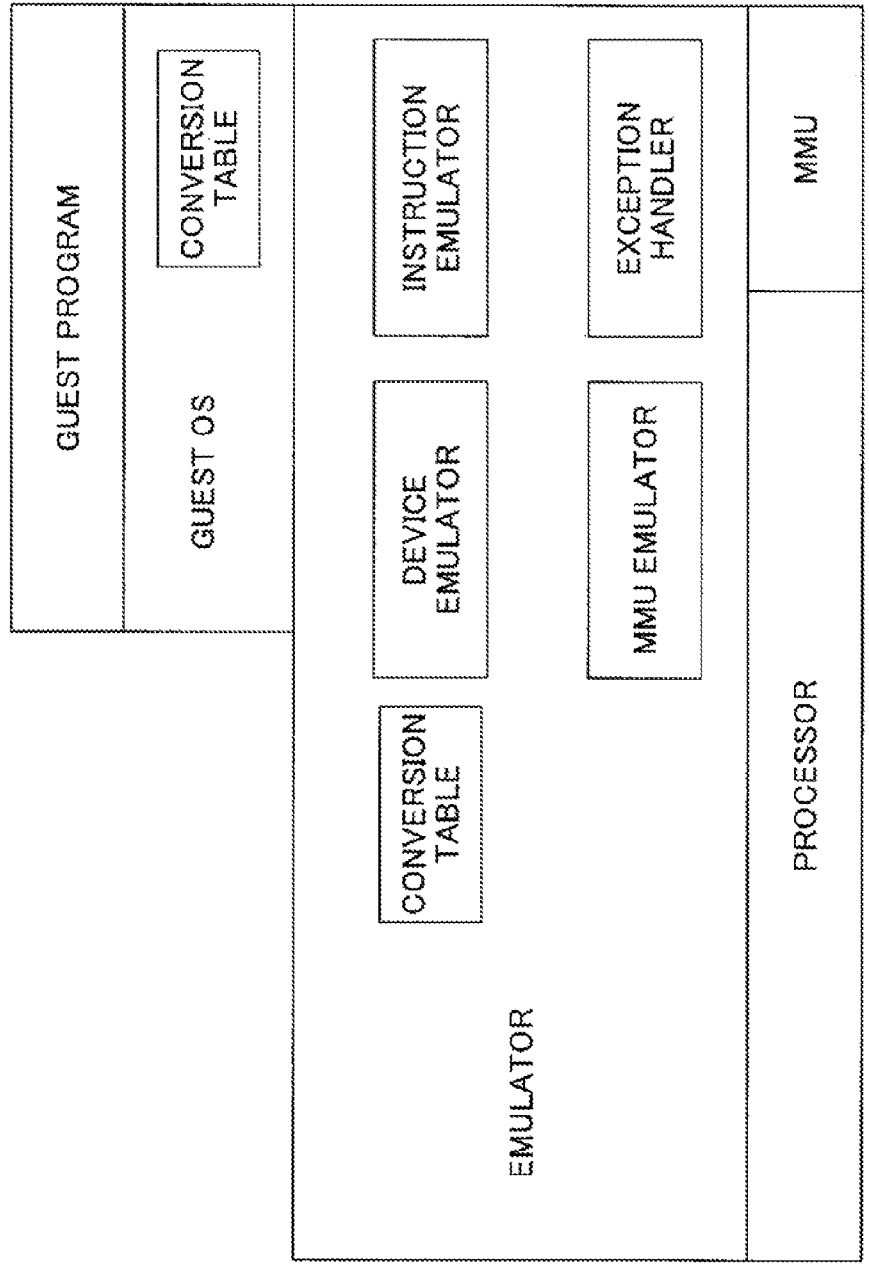
FIG. 11 is an example software configuration of an emulation device (processor emulation device) 3 according to a third embodiment.

FIG. 11 illustrates an example software configuration of an emulation device (processor emulation device) 3 according to a third embodiment. When compared with the first embodiment, in the emulation device 3 according to the third embodiment, the emulator 50 includes the MMU emulator, the exception handler, the device emulator, and the instruction emulator, and serves (is functioned) as a hypervisor.

According to an embodiment, an emulation device (processor emulation device) includes an address converter and an exception handling part.

The address converter converts a virtual address in a guest environment into a physical address in a host environment, a correspondence between the virtual address and the physical address in the guest environment being different from the correspondence between the virtual address and the physical address in the host environment.

The exception handling part performs, when a page attribute is not included in the host environment and is specific to the guest environment, the page attribute being acquired when the virtual address in a guest environment is converted into a physical address in a host environment, an exception handling process by reflecting the attribute specific to the guest environment.

According to an embodiment, the exception handling part may store, when the page attribute corresponds to a specific attribute among attributes specific to the guest environment, a conversion table corresponding to an identifier of a virtual address space provided for a program to be executed in the guest environment and store, when the identifier of the virtual address space is changed, the conversion table.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it is to be understood that various changes, substitutions, and alterations could be made hereto without departing from the sprit and scope of the invention.

What is claimed is:

1. A processor emulation device comprising:
an address converter configured to convert a virtual address in a guest environment into a physical address in a host environment, wherein a correspondence between the virtual address and a physical address in the guest environment is different from a correspondence between a virtual address and the physical address in the host environment controlled by a host OS; and
an exception handler activated by the address converter in a case where a page attribute obtained, from a virtual address issued by an application program in the guest environment, when converting the virtual address in the guest environment into the physical address in the guest environment is an attribute specific to the guest environment and absent in the host environment, and configured to perform an exception handling process based on the attribute specific to the guest environment,
wherein the address converter is configured to determine whether the page attribute is specific to the guest environment, register, when the page attribute is specific to the guest environment, the page attribute into a specific attribute list stored by the address converter, and convert, when the page attribute is not specific to the guest environment, the virtual address in the guest environment into the physical address in the host environment,
wherein the exception handler is configured to store, when the page attribute is a particular attribute among attributes specific to the quest environment, a conversion table on a virtual address space identifier basis, wherein the conversion table indicates a correspondence between the virtual address in the guest environment and the physical address in the host environment, the virtual address space identifier is provided on a program basis, the program is operated in the quest environment, and the conversion table is switched when the virtual address space identifier is changed.

2. A non-transitory storage medium storing a computer-readable emulation program to instruct a computer to execute the steps of:
converting a virtual address in a guest environment into a physical address in a host environment, wherein a correspondence between the virtual address and a physical address in the guest environment is different from a correspondence between a virtual address and the physical address in the host environment controlled by a host OS; and
activating an exception handler in a case where a page attribute obtained, from a virtual address issued by an application program in the guest environment, when converting the virtual address in the guest environment into the physical address in the guest environment is an attribute specific to the guest environment and absent in the host environment, to perform an exception handling process based on the attribute specific to the guest environment,
wherein the converting includes
determining whether the page attribute is specific to the guest environment,
registering, when the page attribute is specific to the guest environment, the page attribute into a specific attribute list, and
converting, when the page attribute is not specific to the guest environment, the virtual address in the guest environment into the physical address in the host environment,
wherein the activating includes
storing, when the page attribute is a particular attribute among attributes specific to the guest environment, a conversion table on a virtual address space identifier basis,
wherein the conversion table indicates a correspondence between the virtual address in the quest environment and the physical address in the host environment, the virtual address space identifier is provided on a program basis, the program is operated in the quest environment, and the conversion table is switched when the virtual address space identifier is changed.

* * * * *